(12) United States Patent
Mula et al.

(10) Patent No.: US 11,656,958 B2
(45) Date of Patent: May 23, 2023

(54) REDUNDANCY DATA BUS INVERSION SHARING

(71) Applicant: MELLANOX TECHNOLOGIES, LTD., Yokneam (IL)

(72) Inventors: Liron Mula, Ramat Gan (IL); Gil Levy, Hod Hasharon (IL); Itamar Rabenstein, Petach Tikva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 239 days.

(21) Appl. No.: 17/244,539

(22) Filed: Apr. 29, 2021

(65) Prior Publication Data

US 2022/0350713 A1 Nov. 3, 2022

(51) Int. Cl.
*G06F 11/20* (2006.01)
*G06F 9/50* (2006.01)
*G06F 13/20* (2006.01)

(52) U.S. Cl.
CPC ........ *G06F 11/2007* (2013.01); *G06F 9/5011* (2013.01); *G06F 13/20* (2013.01); *G06F 2201/85* (2013.01)

(58) Field of Classification Search
CPC .... G06F 11/2007; G06F 9/5011; G06F 13/20; G06F 2201/85
See application file for complete search history.

(56) References Cited

U.S. PATENT DOCUMENTS

| | | | |
|---|---|---|---|
| 4,667,337 A | * | 5/1987 | Fletcher ............. H03K 19/0008 326/62 |
| 10,491,238 B2 | | 11/2019 | Sudhakaran et al. |
| 10,491,435 B2 | | 11/2019 | Lee et al. |
| 10,594,337 B2 | | 3/2020 | Sudhakaran et al. |
| 10,599,606 B2 | | 3/2020 | Lee et al. |
| 10,623,200 B2 | | 4/2020 | Wilson et al. |
| 10,657,094 B2 | | 5/2020 | Lee et al. |

(Continued)

FOREIGN PATENT DOCUMENTS

| | | | | |
|---|---|---|---|---|
| TW | 202147131 A | * | 12/2021 | ......... H04L 25/0272 |
| WO | WO-9403901 A1 | * | 2/1994 | .............. G06F 11/10 |
| WO | WO-2010000621 A1 | * | 1/2010 | .......... G06F 11/2007 |

OTHER PUBLICATIONS

Stan et al. "Bus-Invert Coding for Low-Power I/O," IEEE Transactions on Very Large Scale Integration (VLSI) Systems, Mar. 1995, vol. 3, No. 1, pp. 49-58.

(Continued)

*Primary Examiner* — Matthew M Kim
*Assistant Examiner* — Indranil Chowdhury
(74) *Attorney, Agent, or Firm* — Sheridan Ross PC

(57) ABSTRACT

Methods, systems, and devices for redundant data bus inversion (DBI) sharing are described. A device may identify a group of channels included in a data bus. The device may determine whether the group of channels satisfies a criterion. Based on the determination, the device may allocate an overhead channel to the group of channels for a set of redundancy operations. Based on the determination, the device may allocate the overhead channel to the group of channels for a set of data bus inversion operations. The device may encode data associated with the group of channels based on the allocation of the overhead channel. The overhead channel may be included in the data bus.

22 Claims, 4 Drawing Sheets

(56) References Cited

U.S. PATENT DOCUMENTS

| | | | |
|---|---|---|---|
| 10,979,176 B1 | 4/2021 | Sudharkaran et al. | |
| 11,237,729 B1* | 2/2022 | Dwibedy | G06F 3/061 |
| 2010/0005345 A1* | 1/2010 | Ferraiolo | G11C 29/022 |
| | | | 714/E11.006 |
| 2010/0005349 A1* | 1/2010 | Ferraiolo | G06F 11/0724 |
| | | | 714/E11.002 |
| 2011/0320885 A1* | 12/2011 | Owaki | G06F 11/277 |
| | | | 714/48 |
| 2019/0305765 A1 | 10/2019 | Lee et al. | |
| 2020/0242062 A1 | 7/2020 | Lee et al. | |
| 2023/0032375 A1* | 2/2023 | Busta | G06F 11/27 |

OTHER PUBLICATIONS

Stan et al. "Two-Dimensional Codes for Low Power," Proceedings of the 1996 International Symposium on Low Power Electronics and Design, Aug. 1996, pp. 335-340.

Stan et al. "Low-Power Encodings for Global Communication in CMOS VLSI," IEEE Transactions on Very Large Scale Integration (VLSI) Systems, Dec. 1997, vol. 5, No. 4, pp. 444-455.

Stan "Low Power Encoding for VLSI and ECC Duals," Proceedings 1998 IEEE International Symposium on Information Theory, Aug. 1998, p. 19.

\* cited by examiner

REDUNDANCY DATA BUS INVERSION SHARING

FIELD OF TECHNOLOGY

The present disclosure relates to semiconductor devices, and more particularly, to an architecture that integrates data bus inversion (DBI) and logic redundancy techniques.

BACKGROUND

Some application specific integrated circuit (ASIC) designs may incorporate DBI techniques to provide benefits such as power savings with respect to high width buses and/or reduced signal strength output (SSO) for parallel input/output (I/O) interfaces. In some cases, techniques such as logic redundancy (e.g., the addition of redundant logic or redundant channels) may be implemented in ASIC designs to improve overall yield with respect to fabricated ASICs.

SUMMARY

The described techniques relate to improved methods, systems, devices, and apparatuses that support redundancy DBI sharing. Generally, the described techniques provide for integration of data bus inversion (DBI) and logic redundancy techniques.

An apparatus is provided that includes: a data bus; a processor; and memory in electronic communication with the processor; and instructions stored in the memory, the instructions being executable by the processor to: identify a group of channels included in the data bus; determine whether the group of channels satisfies a criterion; allocate the at least one overhead channel to the group of channels for a set of redundancy operations or a set of data bus inversion operations based on the determining, where the at least one overhead channel is included in the data bus; and encode data associated with the group of channels based on the allocating.

A system is provided that includes: a data bus; a controller, where the controller is configured to: identify a group of channels included in the data bus; determine whether the group of channels satisfies a criterion; and allocate the at least one overhead channel to the group of channels for a set of redundancy operations or a set of data bus inversion operations based on the determining, where the at least one overhead channel is included in the data bus; and a transceiver, where the transceiver is configured to: encode data associated with the group of channels based on the allocating.

A device is provided that includes: a data bus, the data bus including a group of channels and at least one overhead channel; first logic circuitry configured to determine whether the group of channels satisfies a criterion; second logic circuitry configured to allocate the at least one overhead channel to the group of channels for a set of redundancy operations or a set of data bus inversion operations based on the determining; and a transceiver configured to encode data associated with the group of channels based on the allocating. In some examples, the device may be an application specific integrated circuit (ASIC).

A method is provided that includes: identifying a group of channels included in a data bus; determining whether the group of channels satisfies a criterion; allocating the at least one overhead channel to the group of channels for a set of redundancy operations or a set of data bus inversion operations based on the determining, where the at least one overhead channel is included in the data bus; and encoding data associated with the group of channels based on the allocating.

Examples may include one of the following features, or any combination thereof.

In some examples of the apparatus, system, device, and method described herein, allocating the at least one overhead channel for the set of redundancy operations may be based on determining the group of channels satisfies the criterion.

Some examples of the apparatus, system, device, and method described herein may include disabling the set of data bus inversion operations for the group of channels based on determining the group of channels satisfies the criterion.

In some examples of the apparatus, system, device, and method described herein, allocating the at least one overhead channel for the set of data bus inversion operations may be based on determining the group of channels fails to satisfy the criterion.

Some examples of the apparatus, system, device, and method described herein may include enabling the set of data bus inversion operations for the group of channels based on determining the group of channels fails to satisfy the criterion.

Some examples of the apparatus, system, device, and method described herein may include identifying one or more other groups of channels included in the data bus; determining whether each of the one or more other groups of channels satisfies a criterion; and allocating a respective overhead channel to each of the one or more other groups of channels for a set of redundancy operations or a set of data bus inversion operations, where the allocating may be based on the determining; and encoding data associated with the one or more other groups of channels based on the allocating. In some aspects, the respective overhead channels is included in the data bus.

In some examples of the apparatus, system, device, and method described herein, allocating the at least one overhead channel for the set of redundancy operations may be associated with a first priority; and allocating the at least one overhead channel for the set of data bus inversion operations may be associated with a second priority.

In some examples of the apparatus, system, device, and method described herein, the first priority may be higher than the second priority.

In some examples of the apparatus, system, device, and method described herein, the at least one overhead channel may include redundant logic circuitry corresponding to at least one channel of the group of channels.

In some examples of the apparatus, system, device, and method described herein, the criterion may include a defect threshold associated with at least one channel of the group of channels.

Some examples of the apparatus, system, device, and method described herein may include identifying a fault associated with at least one channel of the group of channels; and inverting a logic value associated with each channel of the group of channels or refraining from inverting the logic value associated with each channel of the group of channels, based on a logic value associated with the fault and a logic value associated with the at least one channel, where the encoded data may include the inverted logic value associated with each channel of the group of channels or a non-inverted logic value associated with each channel of the group of channels.

Some examples of the apparatus, system, device, and method described herein may include refraining from bypassing the at least one channel associated with the fault.

In some examples of the apparatus, system, device, and method described herein, the fault may include a stuck-at fault, and the fault may include a logic value of zero or a logic value of one.

In some examples of the apparatus, system, device, and method described herein, the encoded data may include a data bus inversion indicator.

Some examples of the apparatus, system, device, and method described herein may include setting a value for the data bus inversion indicator, where setting the value may be based on inverting the logic value associated with each channel of the group of channels or refraining from inverting the logic value associated with each channel of the group of channels.

In some examples of the apparatus, system, device, and method described herein, the at least one overhead channel may be allocated from a second group of channels included in the data bus.

DETAILED DESCRIPTION

Figure 1:
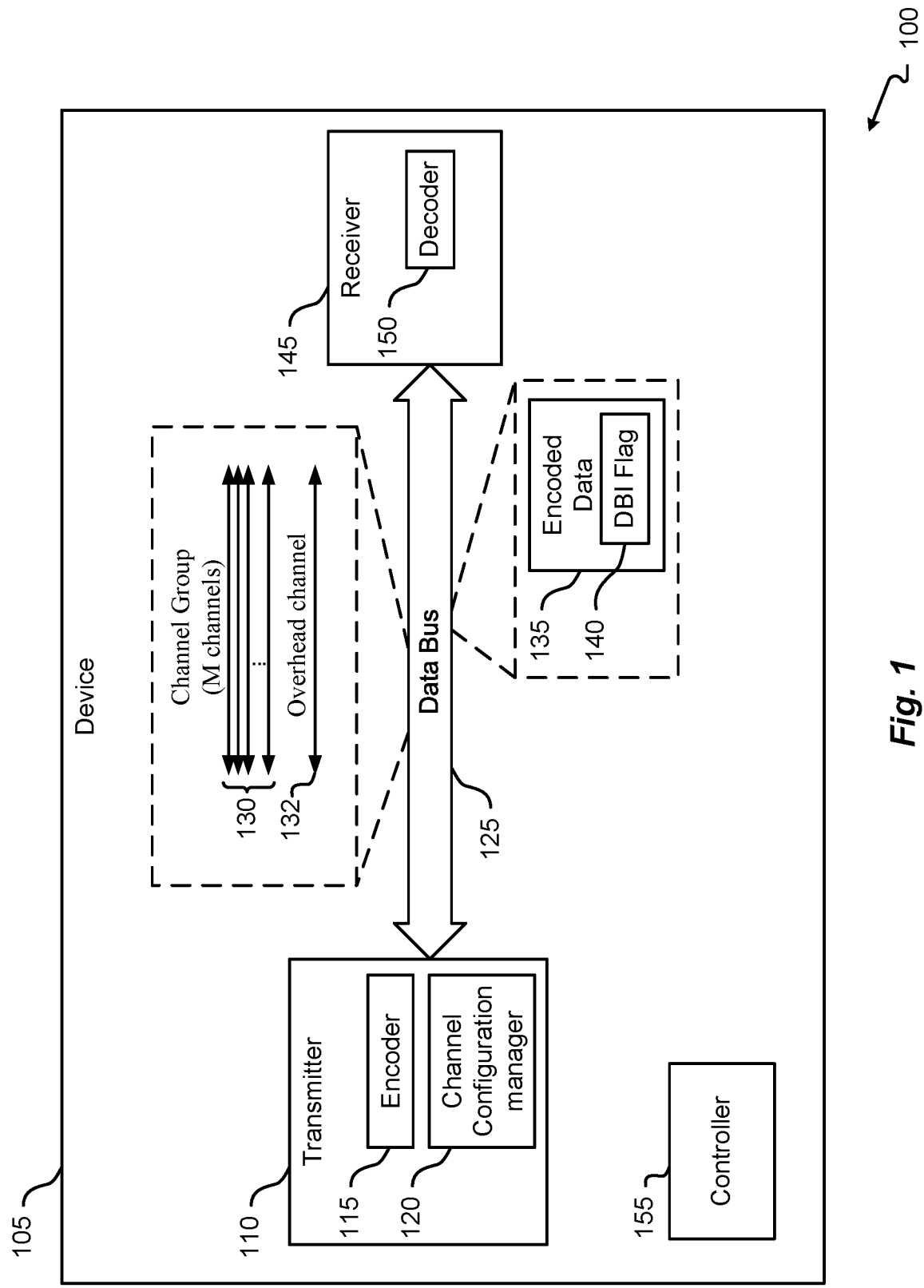
FIG. 1 illustrates an example of a system that supports redundancy DBI sharing in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Various aspects of the present disclosure will be described herein with reference to drawings that are schematic illustrations of idealized configurations.

In some ASIC designs, DBI techniques may be implemented to provide benefits such as power savings with respect to high width buses. In some cases, DBI techniques may provide reduced SSO for parallel I/O interfaces. For example, DBI techniques may include incorporating an additional data bit for each group of bits of a data bus. The group of bits may correspond to a group of channels of the data bus. The additional data bit may indicate whether the data sent over the data bus (e.g., per clock cycle) is the original data or an inverted (e.g., bit flip) version of the data. In some cases, DBI techniques may reduce the number of transitions on a data bus (e.g., down to a toggle rate of 50%), thereby providing power savings and reducing SSO.

For example, some encoding devices (e.g., encoders supporting DBI) may analyze the bit transitions associated with data to be sent. Based on the number or frequency of bit transitions, the encoding devices may determine whether to activate DBI. For example, an encoding device may determine whether to activate DBI based on a comparison of the number of data bit transitions in a current clock cycle to the number of bit transitions in a previous clock cycle. If the number of data bit transitions for the current clock cycle is less than 50% for all the data bits, for example, the encoding device may send the data as-is (e.g., unchanged) and set a DBI bit (also referred to herein as a DBI flag) to a logic value of "0." Alternatively, if the number of data bit transitions is greater than 50%, for example, the encoding device may invert the data (e.g., invert the logic values of the data) and set the DBI bit to a logic value of "1" prior to transmitting the data.

At a decoding device (e.g., a decoder) receiving the data from the encoding device, the decoding device may invert the logic values of the received data (e.g., based on a DBI bit value of "1") or maintain the logic values as-is (e.g., based on a DBI bit value of "0"). Accordingly, in some DBI implementations, overhead may be attributed to the added DBI bit (e.g., the added channel for communicating the DBI bit). For example, the bit overhead for a group of data bits may be defined as 1/N, where N is the size (e.g., number of bits) of the group. Bit overhead may also be referred to herein as channel overhead.

In some cases, for a worst case input with respect to a group of data bits (e.g., each data bit in the group has a 100% toggle rate), DBI techniques may provide a power savings of about 50%. Such power savings may be regardless of the size of the group (e.g., number of bits in the group, number of channels corresponding to the number of bits). In other some cases, for random data inputs with respect to a group of data bits (e.g., each bit in the group has a 50% toggle rate on average, each bit has a 50% probability that the bit will toggle), DBI techniques may provide a power savings that is inversely proportional to the size of the group. For example, for data busses having group sizes of 8 bits, 16 bits, and 32 bits, DBI techniques may provide respective power savings of 15%, 13%, and 11%. In some systems, the design overhead associated with implementing DBI may include an overhead of 1 bit (also referred to herein as 1 I/O) per group of data bits, in addition to added memory and logic circuitry (e.g., logic gates, switches, wires) for supporting DBI encoding and decoding.

In some ASIC designs, techniques such as logic redundancy may be implemented to improve overall yield of fabricated ASICs (e.g., percent of fabricated ASICs that function correctly). For example, ASICs at some processing nodes may suffer from low yield. In an example, in ASIC fabrication, yield may decrease exponentially as die size decreases, and adding redundant logic channels to ASIC designs may assist in improving overall yield. Some logic redundancy techniques may be applied, for example, to ASICs which reach the maximum die size (also referred to herein as a reticle size).

Some logic redundancy techniques may include adding redundant channels for a group of data bits. Channels may be referred to as a high width signals routed over relatively large distances on a die. In some ASICs, switches included in the ASIC may include a relatively large number of channels that occupy a significant portion (e.g., above a threshold percentage) of the ASIC die size, and accordingly, the switches (and corresponding channels) may have a high impact on ASIC yield. Other aspects of logic redundancy relate to interposers used to interconnect multiple dies as part of a multi-package technology. In some cases, an interposer may include the use of parallel I/Os, which may support a large number of signals. In some examples, the use of parallel I/Os may result in a high bandwidth forwarded between different dies on a package.

In some cases, channel (or I/O) redundancy may be implemented by adding a redundant channel (or I/O) for each group of signals. Such techniques may include using a built-in self-test (BIST) for detecting defects on a given channel and replacing a defective channel with the redundant channel (e.g., using multiplexing to bypass the defective channel). In some systems, the design overhead associated with implementing channel (or I/O) redundancy may include an overhead of 1 bit (also referred to herein as 1 I/O) per group of data bits.

According to example aspects of the present disclosure, DBI techniques may provide power savings (e.g., reduction in overall power) for channels enabled for DBI. In some aspects, to achieve significant power savings (e.g., above a percentage or threshold), a data bus may include relatively small groups of channels (e.g., group size of 8 bits, or 8 channels) that share a single overhead channel for DBI. Otherwise, for example with some other devices, significant power savings may be achieved only in worst case conditions of 100% toggle rate.

Aspects of the present disclosure may encompass achieving total power reduction of a device (e.g., reducing overall power associated with all channels). The techniques described herein may support instances in which DBI is not enabled (e.g., not available, not activated) for a relatively small number of channel groups (e.g., 5% of the total number of channel groups) in the data bus. In an example, channel groups in the data bus may each have a group size of 16 bits (or 16 channels). In an example in which 95% of the channel groups are enabled for DBI, overall power savings by DBI may be equal to 95% of the original power savings (e.g., compared to cases in which DBI is enabled for all channels and/or channel groups), which is advantageous compared to some DBI implementations. Accordingly, for example, for a set of multiple channel groups, applying the techniques described herein may satisfy a target power savings of 95% using DBI (rather than 100%). According to some techniques described herein, channel groups that are not enabled for DBI may be enabled for redundancy.

Logic redundancy may be implemented to overcome as many defects as possible in any channel (e.g., to overcome all defects in each channel) of a device. For example, a defect that is not resolved (e.g., bypassed using logic redundancy) may reduce device yield. Some redundancy techniques may include decreasing the overhead (number of channels added) based on the ratio of defects (e.g., the ratio of defects is not high). In some cases, the amount of logic redundancy added to a device may be determined based on the costs associated with additional logic compared to the quantity of defects overcome by the additional logic. For example, for a data bus having a bus width of 128 bits, some redundancy techniques may allocate one redundancy bit as being sufficient for resolving any defects in the data bus. However, in some implementations, channel group size may be selected to be much smaller than 128 bits (128 channels). Such example implementations may reduce corresponding overhead associated with multiplexing between the 128 channels and the single overhead channel for redundancy.

Based on the examples described herein with respect to some DBI techniques and logic redundancy techniques, channel group size in some DBI techniques may be equal to the channel group size in some logic redundancy techniques. From a redundancy perspective, there may be a benefit or need to use logic redundancy on every channel group. However, such approaches may be unattainable (e.g., due to overhead cost). Additionally, due to defect statistical behavior, typically a small number of channel groups (e.g., below a threshold) will have a defect to be addressed by logic redundancy.

According to the present disclosure, example aspects described herein may include an architecture that supports an integration of DBI and logic redundancy techniques. In some aspects, for each group of channels (also referred to herein as a channel groups) in a data bus, the architecture may support a single channel overhead for the group. The single channel overhead may be shared within the group to support both DBI and logic redundancy, thereby taking advantage of the different design parameters (or requirements) that each technique is capable of addressing. The techniques described herein for sharing a single channel overhead among a group of channels may be similarly applied to sharing a single I/O overhead among a group of I/Os (e.g., in the case of an interposer used to interconnect multiple dies as part of a multi-package technology).

In an example, a device (e.g., an ASIC device) may include a data bus that supports the transfer of data bits between different components in the device or between the device and one or more other devices. The data bus may have a width (e.g., bit size) of any number of bits. In an example, the data bus may have a width of 8 bits, 16 bit, 32 bits, 64 bits, 128 bits, etc. The data bus may include any number of channels. In some aspects, the data bus may include a number of channels corresponding to the bus width (e.g., the number of bits).

In some aspects, the data bus may include multiple groups of channels. Each group may have a group size of, for example, 8 bits, 16 bits, 32 bits, 64 bits, etc. In an example aspect, each group of channels may be allocated a shared overhead channel. The device may support, for each group, allocating the shared overhead channel to the group for redundancy operations or DBI operations.

In some cases, for each group, the device may prioritize allocating the shared overhead channel for redundancy operations. For example, for each group, the device may first determine or check (e.g., using a BIST) whether the group has a redundancy need (e.g., one or more defective channels). In an example, for each group of channels, the device may determine or check whether the group has a redundancy need (e.g., a defective channel).

If the device determines a group of channels as having a redundancy need (e.g., one or more defective channels in the group), the device may allocate the shared overhead channel within the group for redundancy operations (e.g., for bypassing the defective channel), and the device may disable DBI for the group. If the device determines a group of channels as not having a redundancy need (e.g., no defective channels in the group), the device may allocate the shared overhead channel within the group for DBI operations, and the device may enable DBI for the group. In some cases, for example, each group of channels may refrain from sharing an allocated shared overhead channel with another group of channels.

For example, for a first group of channels (also referred to herein as a first channel group), the device may determine (e.g., using a BIST) that one or more channels in the first group is defective (e.g., identify a defect in a channel). The device may allocate the shared overhead channel within the first group for redundancy operations (e.g., for bypassing the defective channel), and the device may disable DBI for the first group. In another example, for a second group of channels (also referred to herein as a second channel group), the device may determine (e.g., using a BIST) that no channels in the second group are defective. The device may allocate the shared overhead channel within the second group for DBI operations, and the device may enable DBI for the second group. In some aspects, the BIST may be implemented by logic included in the device, via which the device may verify (e.g., test) operations of the device itself.

In some examples, based on manufacturing yields, it may be expected that a majority (e.g., 95% or more) of the channel groups may not have a redundancy need. For example, the majority of the channel groups may be free from defects (e.g., no defective channels are present in 95% or more of the channel groups), and the device may enable DBI for the channel groups free from defects. Accordingly, for example, a relative minority (e.g., 5% or less) of the channel groups may be enabled for redundancy.

Some additional aspects of the disclosure are described which may support operations for DBI and stuck protection (e.g., stuck-at-fault protection) using redundancy logic associated with an overhead channel. For example, an encoder (e.g., a DBI encoder) and a decoder (e.g., a DBI decoder) may be utilized by a channel group configured for a redundancy mode. Such example aspects may serve as an additional level optimization in which an extra channel (e.g., overhead channel) is the same for both DBI operations and stuck protection, and the optimization may include reuse of the extra logic associated with the extra channel.

In some aspects, at a transmitter side, the redundancy logic described herein may include a 1:N multiplexer on a redundant channel (also referred to herein as an overhead channel), where N is an integer value corresponding to the number of channels in the channel group. The redundant channel may be used by any of the N channels of the channel group. In some other aspects, at a receiver side, the redundancy logic may include a 1:2 multiplexer per each of the N channels of a channel group (e.g., for a total number N of the 1:2 multiplexers). For each of the N channels, the corresponding 1:2 multiplexer may select between the original channel (e.g., if no defect is present) or the redundant channel (e.g., if a defect is present in the original channel).

In some cases, principles for combining both logic (e.g., DBI and stuck protection) may include using DBI for a channel group configured according to a redundancy mode. For example, at the transmitter side, if a defective channel of the channel group is stuck at logic value "0", and a data bit to be transmitted over the defective channel also has a logic value of "0," the transmitter may determine that there is no issue based on the logic values. For example, the transmitter may maintain the logic values as-is (non-inverted) for all channels of the channel group (including the defective channel) and set a DBI flag to logic value "0" (e.g., indicating no DBI). Alternatively, or additionally, if a defective channel of the channel group is stuck at logic value "0", and a data bit to be transmitted over the defective channel also has a logic value of "1," the transmitter may invert the logic values for all channels of the channel group (including the defective channel) and set the DBI flag to logic value "1" (e.g., indicating DBI).

In another example, at the transmitter side, if a defective channel of the channel group is stuck at logic value "1", and a data bit to be transmitted over the defective channel also has a logic value of "0," the transmitter may invert the logic values for all channels of the channel group (including the defective channel) and set the DBI flag to logic value "1" (e.g., indicating DBI). Alternatively, or additionally, if a defective channel of the channel group is stuck at logic value "1", and a data bit to be transmitted over the defective channel also has a logic value of "1," the transmitter may determine that there is no issue based on the logic values. For example, the transmitter may maintain the logic values as-is (non-inverted) for all channels of the channel group (including the defective channel) and set a DBI flag to logic value "0" (e.g., indicating no DBI).

At the receiver side, the receiver may process the received data, without being aware of the mode (e.g., DBI or redundancy). In some aspects, the receiver may be implemented with zero logic overhead for supporting redundancy.

Aspects of the disclosure are further illustrated by and described with reference to apparatus diagrams, system diagrams, and flowcharts that relate to redundancy DBI sharing.

FIG. 1 illustrates an example of system 100 that supports redundancy DBI sharing in accordance with aspects of the present disclosure. The system 100 may include a device 105. The device 105 may be, for example, an electronic device capable of connecting to a wireless or wired network. The device 105 may be, for example, an ASIC device.

The device 105 may include a transmitter 110 (also referred to herein as a transmitting device), a data bus 125, and a receiver 145 (also referred to herein as a receiving device). The data bus 125 may support the transfer of data bits between different components in the device 105 and/or the transfer of data bits between the device 105 and one or more other devices 105. For example, the data bus 125 may support the transmission of data between the transmitter 110 and the receiver 145. The data bus 125 may be included in a transmission medium such as, for example, a package/printed circuit board (PCB) transmission line. In some aspects the transmission medium may include a wireless channel. In some other aspects, the transmission medium may include a coaxial cable, a silicon interposer trace, or any other wireline interconnect technology. In some aspects, the transmission medium may include wires or interconnect inside an ASIC (e.g., silicon).

In an example, the data bus 125 may have a width (e.g., bit size) of any number of bits. In an example, the data bus 125 may have a width of 8 bits, 16 bit, 32 bits, 64 bits, 128 bits, etc. The data bus may include a number of channels (e.g., N channels) corresponding to the bus width (e.g., the number of bits). In some aspects, the data bus 125 may include one or more channel groups 130 and one or more overhead channels 132. For example, the data bus 125 may include multiple channel groups 130 and multiple overhead channels 132, and each channel group 130 may be allocated a respective overhead channel 132.

Each channel group 130 may include any number of channels. For example, the channel group 130 may include M channels (e.g., 8 channels, 16 channels, 32 channels 64 channels, etc.). In some examples, each channel group 130 may have a bit width of, for example, 8 bits, 16 bit, 32 bits, 64 bits, etc., and the overhead channel 132 may have a bit width of, for example, 1 bit. In some aspects, for each channel group 130, the overhead channel 132 may be included in (e.g., allocated from, shared by) another channel group 130. In some cases, for each channel group 130, the overhead channel 132 may not be shared from another channel group 130.

In an example of multiple channel groups 130, the group sizes may be the same among the channel groups 130. In some examples, the group sizes may be different among the channel groups 130. For example, each channel group 130 may have a group size equal to M channels, and each channel group 130 may be allocated a respective overhead channel 132. In some aspects, the data bus 125 may include any number of channel groups 130.

The transmitter 110 may include an encoder 115. The encoder 115 may encode data using one or more encoding algorithms. For example, the encoder 115 may encode data using one or more DBI encoding algorithms. In some examples, using DBI encoding, the device 105 may invert data bits prior to transmission, thereby providing increased power savings and reduced SSO. DBI encoding may include bit inversion encoding for any parallel interface, including commands, address information, etc. The device 105 (e.g., transmitter 110) may transmit the encoded data to the receiver 145 via the data bus 125. In some aspects, the device 105 may support any combination of processing data according to any combination of DBI operations, logic redundancy operations, and/or encoding operations prior to transmitting data over the data bus 125.

For example, the transmitter 110 may include a 1:M multiplexer configured to electrically couple any of the M channels in the channel group 130 to the overhead channel 132. In an example, for a given channel, the transmitter 110 may use the 1:M multiplexer to electrically couple the given channel to the overhead channel 132, thereby bypassing at least a portion of the given channel. In some aspects, the device 105 may transmit signals intended for the defective channel(s) of a channel group 130, over the respective overhead channel 132 allocated for the channel group 130.

The receiver 112 may include a decoder 150. The decoder 150 may decode data using one or more decoding algorithms. For example, the decoder 150 may use one or more DBI encoding algorithms to decode the data (e.g., encoded data 135) transmitted over the data bus 125. The decoding algorithms (e.g., DBI decoding algorithms) may correspond to the encoding algorithms used by the transmitter 110 for encoding data. The decoder 150 may output unencoded data corresponding to the original data encoded by the encoder 115.

In some aspects, the receiver 145 may include a 1:2 multiplexer at each of the M channels in the channel group 130. In an example, the receiver 145 may include a total of M multiplexers, where each multiplexer is a 1:2 multiplexer. Each 1:2 multiplexer may be electrically coupled to the overhead channel 132 and one of the M channels of the channel group 130. For example, each 1:2 multiplexer may be configured to output (e.g., based on a selection by the receiver 145) a signal communicated across a corresponding channel or the overhead channel 132.

In some aspects, the transmitter 110 and the receiver 145 may be included the same chip (e.g., ASIC chip) of the device 105. In some other aspects, the transmitter 110 and the receiver 145 may respectively be located on different chips of the device 105. In some aspects, the transmitter 110 and the receiver 145 may also be located on different electronic devices. For example, the transmitter 110 may be located on a chip of the device 105, and the receiver 145 may be located on a chip of another device 105. In an example, the transmitter 110 may be included in a transceiver included in the device 105, and the receiver 145 may be included in transceiver included in another device 105.

The transmitter 110 may include a channel configuration manager 120. In some aspects, the channel configuration manager 120 may select, set, and/or configure one or more DBI encoding algorithms for encoding data to be transmitted by the device 105 (e.g., to be transmitted over the data bus 125). In some aspects, the channel configuration manager 120 may initiate and/or perform one or more operations (e.g., BISTs, any design-for-testability (DFT) technique)) for verifying the functionality of any components (e.g., channel groups 130, ASICs) included in the device 105.

In an example, the channel configuration manager 120 may analyze channels included in the data bus 125. For example, the channel configuration manager 120 may analyze whether channel groups 130 included in the data bus 125 satisfy a criterion (e.g., a defect threshold described herein). In some aspects, for each channel group 130, the channel configuration manager 120 may allocate an overhead channel 132 included in the channel group 130 for redundancy operations or DBI operations based on the analysis. In some examples, the channel configuration manager 120 may disable DBI operations for a channel group 130 for which a respective overhead channel 132 is allocated for redundancy operations. In another example, the channel configuration manager 120 may enable DBI operations for a channel group 130 for which a respective overhead channel 132 is allocated for DBI operations. The channel configuration manager 120 may set (e.g., select and/or configure) DBI encoding algorithms associated with DBI operations enabled for a channel group 130.

The channel configuration manager 120 may perform any of the described operations independently and/or based on instructions from a controller 155 (also referred to herein as a mode controller). For example, the channel configuration manager 120 may allocate overhead channels for redundancy operations and/or DBI operations independently and/or based on instructions from the controller 155. In some examples, the channel configuration manager 120 may enable or disable DBI operations independently and/or based on instructions from the controller 155. In some cases, the channel configuration manager 120 may set DBI encoding algorithms independently and/or based on instructions from the controller 155. In some example aspects, the channel configuration manager 120 may include logic circuitry (e.g., logic gates) described herein for bypassing a defective channel(s).

The controller 155 may be located on a same chip (e.g., ASIC chip) as the transmitter 110 and/or the receiver 145. In some cases, the controller 155 may be located on a different chip as the transmitter 110 and/or the receiver 145. In some examples, the transmitter 110 may be located on a chip of the device 105, and the controller 155 may be located on the same chip (or on a different chip) of the device 105. In another example, the receiver 145 may be located on a chip of another device 105, and a corresponding controller 155 may be located on the same chip (or on a different chip) of the other device 105.

The controller 155 may instruct the transmitter 110 to use one or more DBI encoding algorithms for encoding data to be sent via the data bus 125. In some examples, the controller 155 may instruct the receiver 145 to use one or more DBI decoding algorithms for decoding data that is sent via the data bus 125.

According to example aspects of the present disclosure, the device 105 may include a device architecture that supports an integration of DBI and logic redundancy techniques. As described herein, the data bus 125 may include one or more channel groups 130, and each channel group 130 may be allocated an overhead channel 132 (also referred to herein as a shared overhead channel). In some aspects, for a channel group 130, the device 105 may support allocating the overhead channel 132 within the channel group 130 for redundancy operations or DBI operations. For example, the device 105 may support allocating a respective overhead channel 132 to a channel group 130 for redundancy operations or DBI operations.

In some cases, the data bus 125 may include multiple channel groups 130, and for each channel group 130, the device 105 may prioritize allocating the respective overhead channel 132 for redundancy operations over allocating the overhead channel 132 for DBI operations. For example, for each channel group 130, the device 105 may first determine whether to allocate the respective overhead channel 132 for redundancy operations. For each channel group 130 the device 105 determines not to allocate the respective overhead channel 132 for redundancy operations, the device 105 may allocate the respective overhead channel 132 for DBI operations.

The example operations described herein may be applied by the device 105 for one or more channel groups 130 included in the data bus 125. In an example, the device 105 may analyze each channel group 130 to determine whether to allocate a respective overhead channel 132 for redundancy operations or DBI operations. In some aspects, for multiple channel groups 130, the device 105 may analyze the channel groups 130 based on a configured sequence or order. For example, the device 105 may analyze the channel groups 130 according to an order based on channel group size. In some other aspects, the device 105 may analyze the channel groups 130 in any order. In some other aspects, for multiple channel groups 130, the device 105 may analyze the channel groups 130 in parallel.

For example, the device 105 may identify a channel group 130. The device 105 may determine whether the identified channel group 130 satisfies a criterion (e.g., a defect threshold). For example, the device 105 may be perform one or more manufacturing tests for detecting defects (e.g., BISTs, DFTs) in the channel group 130. In some examples, the manufacturing tests may include one or more BISTs which the device 105 may apply for verifying the functionality of the channel group 130. In some cases, the device 105 may apply one or more BISTs for verifying the functionality of any components (e.g., other channel groups 130, ASICs) included in the device 105.

In an example, the device 105 may detect (e.g., using a BIST) whether at least one channel of the channel group 130 includes a defect. If the device 105 detects that at least one channel of the channel group 130 includes a defect, the device 105 may allocate the overhead channel 132 to the channel group 130 for redundancy operations. In some examples, the defect detected for may be a stuck-at fault. For example, the defect may be that at least one channel of the channel group 130 is stuck at a logic value of "0" or "1." If the device 105 detects a stuck-at fault, the device 105 may share the overhead channel 132 within the channel group 130 for both redundancy operations and DBI operations (e.g., using DBI to further optimize the redundancy operations). Alternatively, or additionally, if the device 105 detects that no channels in the channel group 130 include a defect, the device 105 may allocate the overhead channel 132 to the channel group 130 for DBI operations (e.g., and not for redundancy operations).

In some aspects, the device 105 (e.g., transmitter 110) may encode data to be transmitted over the channel group 130, based on the allocation of the overhead channel 132. For example, the device 105 (e.g., encoder 115) may encode the data according to whether the overhead channel 132 is allocated for redundancy operations or DBI operations. In an example, the device 105 (e.g., encoder 115) may output encoded data 135 in combination with a DBI flag 140 (also referred to herein as a DBI indicator). The DBI flag 140 may be a data bit (e.g., logic value of "0" or "1") indicating whether the encoded data 135 sent over the data bus 125 (per clock cycle) represents the original data encoded by the encoder 115 of the device 105 or an inverted (e.g., bit flip) version of the data. The DBI flag 140 may be included in the encoded data 135. In some aspects, the device 105 (e.g., encoder 115) may set the value of the DBI flag 140.

In some aspects, the redundancy operations may include bypassing the defective channel(s), for example, using a combination of logic circuitry (e.g., logic gates) and the overhead channel 132. For example, for a defective channel included among the M channels, the redundancy operations may include using the 1:N multiplexer (e.g., at the transmitter 110) to bypass the defective channel. In an example of redundancy operations, the device 105 may communicate signals intended for the defective channel, over the overhead channel 132.

The receiver 145 may receive the encoded data 135 (including the DBI flag 140). In some aspects, if the receiver 145 detects the DBI flag 140 has a logic value of "0" (e.g., indicating original data or non-inverted data), the receiver 145 may identify that the encoded data 135 includes non-inverted data. In another example, if the receiver 145 detects the DBI flag 140 has a logic value of "1" (e.g., inverted data), the receiver 145 may identify that the encoded data 135 includes inverted data.

In an example in which the device 105 has allocated the overhead channel 132 for redundancy operations (e.g., disabled DBI for the channel group 130), the receiver 145 may be aware of the redundancy mode of operation. In an example, if the transmitter 110 and receiver 145 are configured for redundancy mode, there is no inversion of data (e.g., the encoded data 135 includes non-inverted data). For each of the M channels in the channel group 130, the receiver 145 may select (e.g., using a corresponding 1:2 multiplexer) the channel or the overhead channel 132.

In some aspects, the receiver 145 may receive the data associated with the M channels in parallel. In some other aspects, the receiver 145 may receive the data associated with each of the M channels sequentially (e.g., per clock cycle).

In an example, if the device 105 detects a defective channel(s) in the channel group 130, the device 105 may allocate the overhead channel 132 for redundancy operations (e.g., a redundancy mode), and the device 105 may disable DBI for the channel group 130 (e.g., allocate the DBI flag 140 (i.e., DBI bit) for non-DBI purposes). For example, the device 105 (e.g., at the transmitter 110 or encoder 115) may allocate the DBI flag 140 for substituting the signal of a defective channel. The receiver 145 (e.g., decoder 150), aware of the mode, may refrain from inverting the data received from the transmitter 110 (e.g., encoder 115). The device 105 may refrain from inverting the logic values associated with the M channels.

In another example, if the device 105 determines that there are no defective channels in the channel group 130, the device 105 may allocate the overhead channel 132 for DBI operations, and the device 105 may enable DBI for the channel group 130 (e.g., for all M channels in the channel group 130). In an example, for a case in which DBI is enabled for the channel group 130, the device 105 may determine whether to activate DBI (e.g., invert the logic values associated with all M channels, set the DBI flag 140 to logic value "1") or not activate DBI (e.g., maintain the logic values as-is (non-inverted) for all M channels, set the DBI flag 140 to logic value "0").

In some aspects, for an example case in which an overhead channel 132 is allocated for redundancy operations for a channel group 130, the device 105 (e.g., transmitter 110, encoder 115) may activate DBI or deactivate DBI in association with redundancy operations. In an example, the device 105 may activate DBI or deactivate DBI for the redundancy operations based on a trigger (condition) for bypassing a defective channel (e.g., having a stuck-at-fault) included among the M channels of the channel group 130. Such techniques may differ from some DBI implementations for activating DBI or deactivating DBI based on a power savings threshold. Example aspects of activating DBI or deactivating DBI based on a trigger for bypassing a defective channel (e.g., having a stuck-at-fault), thereby providing additional levels of optimization in which DBI logic is applied for (e.g., shared) for redundancy operations, are described with reference to FIG. 2.

In some other aspects, for an example case in which DBI is enabled for power savings (e.g., a power save mode), the device 105 (e.g., transmitter 110, encoder 115) may determine to activate DBI for a channel group 130 based on the number of bit transitions in the M channels of the channel group 130 (e.g., per clock cycle). Alternatively, or additionally, based on the number of bit transitions, the device 105 may determine not to activate DBI. For example, the device 105 (e.g., encoder 115) may compare the number of bit transitions among the M channels of the channel group 130 in a current clock cycle to the number of bit transitions in a previous clock cycle. If the number of bit transitions is less than 50%, for example, the device 105 (e.g., transmitter 110, encoder 115) may encode and transmit the data for all M channels of the channel group 130 as-is (e.g., unchanged) and set the DBI flag 140 to logic value "0." Alternatively, if the number of bit transitions is greater than 50%, for example, the device 105 (e.g., transmitter 110, encoder 115) may invert the data (e.g., invert the logic values of the data) for all M channels of the channel group 130 and set the DBI flag 140 to logic value "1," when generating the encoded data 135.

The techniques described herein for allocating an overhead channel 132 to each channel group 130 (e.g., sharing the overhead channel 132 among M channels of a channel group 130) may be similarly applied to I/Os (e.g., in the case of an interposer used to interconnect multiple dies as part of a multi-package technology). For example, aspects of the present disclosure may be applied to an interposer including one or more I/O groups. In some aspects, for an I/O group, the device 105 may support allocating an overhead I/O (also referred to herein as a shared overhead I/O) to the I/O group for redundancy operations and/or allocating the overhead I/O for DBI operations. For example, for an I/O group, the device 105 may support allocating the overhead I/O to the I/O group for redundancy operations or DBI operations. In some aspects, for each I/O group, the device 105 may prioritize allocating a corresponding overhead I/O for redundancy operations over allocating the overhead I/O for DBI operations.

An example implementation for providing DBI operations in combination with redundancy operations is described with reference to FIG. 2.

Figure 2:
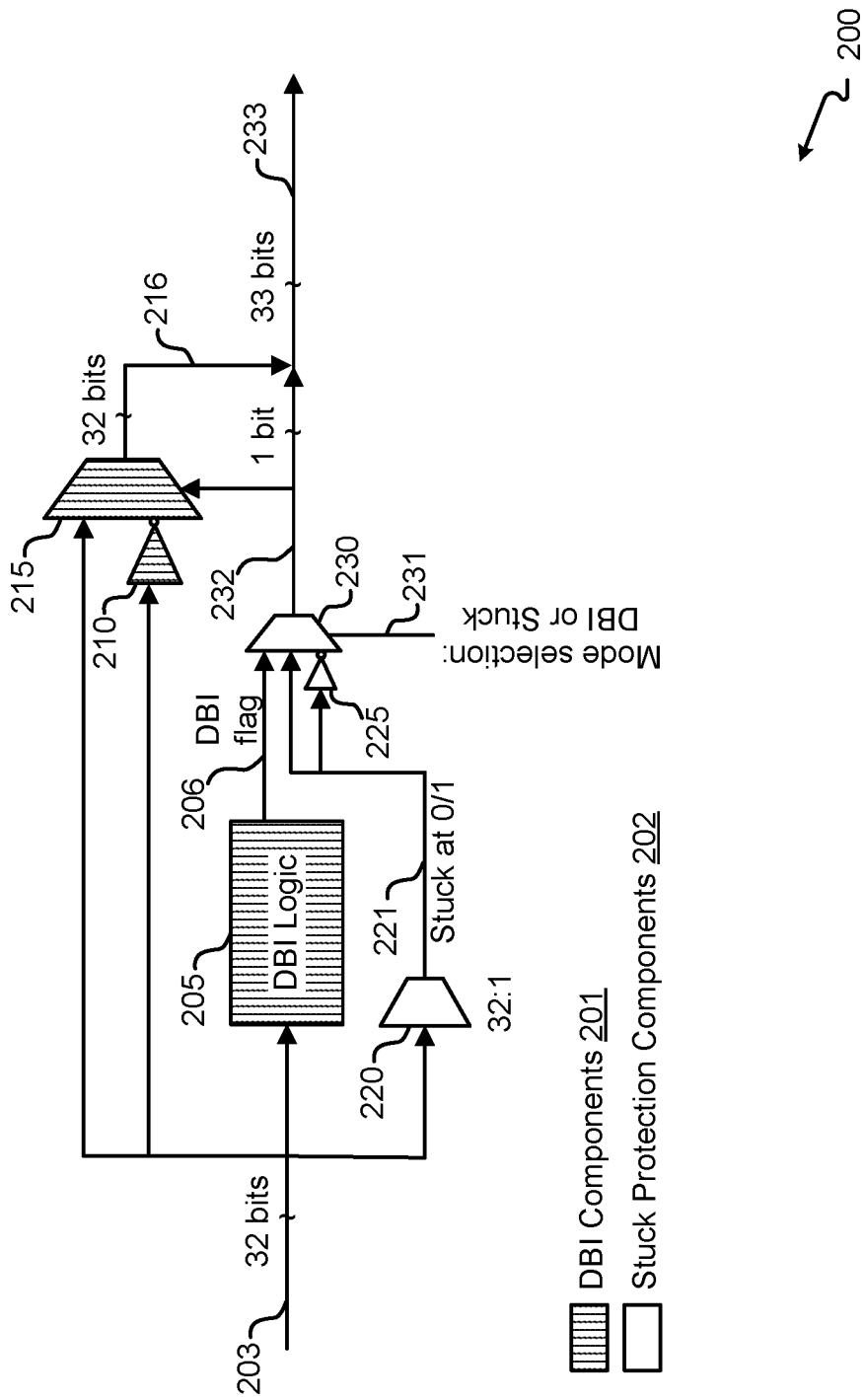
FIG. 2 illustrates an example of an encoder that supports redundancy DBI sharing in accordance with aspects of the present disclosure.

FIG. 2 illustrates an example of an encoder 200 that supports redundancy DBI sharing in accordance with aspects of the present disclosure. The encoder 200 may include aspects of the device 105 described with reference to FIG. 1. For example, the encoder 200 may include aspects of the transmitter 110, the encoder 115, and/or the channel configuration manager 120 described with reference to FIG. 1. The encoder 200 may support operations for DBI and operations for stuck protection (e.g., stuck-at-fault protection).

Aspects of the encoder 200 are described with reference to providing additional levels of optimization in which DBI logic is applied for (e.g., shared for) redundancy operations. Example aspects of the encoder 200 are described with reference to a channel group 130 described with reference to FIG. 1, in which the channel group 130 may be allocated an overhead channel 132. The encoder 200 (and a corresponding decoder, not shown) may be utilized for communicating data over the channel group 130. In an example, the channel group 130 includes M channels (e.g., 8 channels, 16 channels, 32 channels, 64 channels, etc.). In the example of FIG. 2, the channel group 130 includes 32 channels (e.g., M is equal to 32).

The encoder 200 may include DBI components 201 and stuck protection components 202. The DBI components 201 may include, for example, DBI logic 205, an inverter 210, and a multiplexer 215 (e.g., a 1:M multiplexer, where M is equal to 32). The stuck protection components 202 may include, for example, a multiplexer 220 (e.g., a 1:M multiplexer, where M is equal to 32), an inverter 225, and a multiplexer 230 (e.g., a 1:3 multiplexer).

In some example aspects, the DBI components 201 and stuck protection components 202 may include any number of components supportive of the DBI operations, logic redundancy operations, and/or stuck protection described herein. For example, the DBI components 201 and stuck protection components 202 may include additional or less components (e.g., drivers, logic devices, switches, wires, etc.) than those illustrated in FIG. 2.

In an example described with reference to FIG. 1 and FIG. 2, the channel group 130 is configured for redundancy operations (a redundancy mode) using the overhead channel 132, and the encoder 200 (and corresponding decoder) may provide an additional level optimization for sharing the overhead channel 132 between DBI operations and logic redundancy operations. In an example, the DBI components 201 and the stuck protection components 202 may correspond to portions of the logic (also referred to herein as additional logic or redundant logic) provided by the overhead channel 132.

In an example, the device 105 has detected (e.g., using a BIST, DFT, etc.) that at least one channel of the channel group 130 includes a defect (e.g., a stuck-at fault). Based on the detection of a defect that is a stuck-at fault, the device 105 has allocated the overhead channel 132 to the channel group 130 for both redundancy operations and DBI operations (e.g., using DBI to further optimize the redundancy operations).

The encoder 200 may receive input data 203 including a set of data bits. In the example of FIG. 2, the input data 203 may have a bit width (also referred to herein as a bit length) of 32 bits. The data bits (e.g., 32 bits) of the input data 203 may correspond to the M channels (e.g., 32 channels) of the channel group 130. In an example, the encoder 200 may encode the input data 203 using a combination of the DBI components 201 and the stuck protection components 202. For example, the encoder 200 may feed the input data 203 to the DBI logic 205, the inverter 210, the multiplexer 215, and the multiplexer 220.

The DBI logic 205 may set a logic value of a DBI flag 206 to logic value "0" or "1." The DBI logic 205 may output the DBI flag 206 to the multiplexer 230. Example aspects of the DBI logic 205 are described below. The multiplexer 215 may output data 216 (e.g., 32 bits) corresponding to the input data 203. In an example, the data 216 may include an inverted (e.g., by the inverter 210) set of logic values corresponding to the input data 203. Alternatively, or additionally, the data 216 may include a non-inverted set of logic values corresponding to the input data 203.

The multiplexer 220 may select any of the M channels in the channel group 130. For example, the multiplexer 220 may electrically couple any of the M channels to the multiplexer 230 (e.g., directly or via the inverter 225) so as to forward a signal thereof. In an example, for a defective channel (e.g., having a stuck-at-fault) among the M channels of the channel group 130, the multiplexer 220 may electrically couple the defective channel to the multiplexer 230 (e.g., directly or via the inverter 225), for example, so as to forward the signal 221 (e.g., stuck-at-fault value) thereof.

The multiplexer 230 may select between the DBI flag 206, the signal 221, or an inverted signal (e.g., via the inverter 225) corresponding to the signal 221. In some aspects, the multiplexer 230 may determine the selection based on a mode selection signal 231 (e.g., DBI or stuck) provided by the device 105. The multiplexer 230 may output a signal 232 (e.g., 1 bit) based on the selection. In some aspects, the mode selection signal 231 may be provided by the controller 155 described with reference to FIG. 1.

In an example, the encoder 200 may transmit encoded data 233 (e.g., encoded data bits, 33 data bits) over the channel group 130. For example, the encoder 200 may transmit, over the M channels (e.g., 32 channels) of the channel group 130, data bits corresponding to the input data 203. The encoder 200 may transmit a data bit (e.g., corresponding to the DBI flag 206, the signal 221, or the inverted signal corresponding to the signal 221) over the overhead channel 132 of the channel group 130.

According to example aspects of the present disclosure, based on one or more logic values of the input data 203 and the logic value of the defective channel (e.g., stuck-at-fault), the encoder 200 may activate DBI or deactivate DBI for implementing aspects of the redundancy mode. For example, the encoder 200 may invert the logic values associated with all M channels of the channel group 130 (e.g., invert the logic values of the input data 203) and set the DBI flag 206 to logic value "1." Alternatively, or additionally, the encoder 200 may maintain the logic values as-is (non-inverted) for all M channels of the channel group 130 and set the DBI flag 206 to logic value "0."

As described herein with reference to the M channels of the channel group 130, for cases in which the stuck-at-fault value of a defective channel is the same as the logic value of a data bit to be transmitted over the defective channel, the device 105 may maintain logic values associated with all M channels of the channel group 130 and set the DBI flag 206 to "0." In another aspect, for cases in which the stuck-at-fault value of a defective channel is different from the logic value of a data bit to be transmitted over the defective channel, the device 105 may invert logic values associated with all M channels of the channel group 130 and set the DBI flag 206 to "1."

In an example, the device 105 may identify that a channel of the channel group 130 is stuck at logic value "0" (e.g., the channel is a defective channel). At one or more clock cycles, if the device 105 identifies that a data bit to be transmitted over the defective channel also has a logic value of "0," the encoder 200 may maintain the logic value as-is (non-inverted) for the defective channel. In some aspects, the encoder 200 may maintain the logic values as-is (non-inverted) for all M channels of the channel group 130 (e.g., maintain the logic values of the input data 203) and set the DBI flag 206 to logic value "0." Alternatively, or additionally, at one or more clock cycles, if the device 105 identifies that the data bit to be transmitted over the channel has a logic value of "1," the encoder 200 may invert the logic value for the defective channel. In some aspects, the encoder 200 may invert the logic values associated with all M channels of the channel group 130 (e.g., invert the logic values of the input data 203) and set the DBI flag 206 to logic value "1."

In another example, the device 105 may identify that a channel of the channel group 130 is stuck at logic value "1" (e.g., the channel is a defective channel). At one or more clock cycles, if the device 105 identifies that a data bit to be transmitted over the defective channel has a logic value of "0," the encoder 200 may invert the logic value for the defective channel. In some aspects, the encoder 200 may invert the logic values associated with all M channels of the channel group 130 (e.g., invert the logic values of the input data 203) and set the DBI flag 206 to logic value "1." Alternatively, or additionally, at one or more clock cycles, if the device 105 identifies that the data bit to be transmitted over the channel has a logic value of "1," the encoder 200 may maintain the logic value as-is (non-inverted) for the defective channel. In some aspects, may maintain the logic values as-is (non-inverted) for all M channels of the channel group 130 (e.g., maintain the logic values of the input data 203) and set the DBI flag 206 to logic value "0."

In reference to the example aspects described herein, the device 105 may activate DBI or deactivate DBI for redundancy operations. The device 105 may activate DBI or deactivate DBI based on a trigger (condition) for bypassing a defective channel (e.g., bypassing a stuck-at-fault), which may differ from some DBI implementations for activating DBI or deactivating DBI based on a power savings threshold.

In some aspects, a device 105 (e.g., a decoder) receiving the encoded data 233 may support the redundancy techniques described herein, without additional logic overhead (e.g., without an additional multiplexer for switching to redundancy logic). For example, the encoder 200 may refrain from indicating the mode selection 231 (e.g., DBI or stuck) to a device 105 (e.g., decoder) receiving the encoded data 233. In some examples, the decoder may be unaware of the mode selection 231. That is, for example, the decoder may be unaware of whether DBI is used or logic redundancy is being used at the encoder 200. For example, the decoder may be unaware of whether additional logic overhead is being utilized at the encoder 200 for DBI (e.g., and power savings) or logic redundancy.

Figure 3:
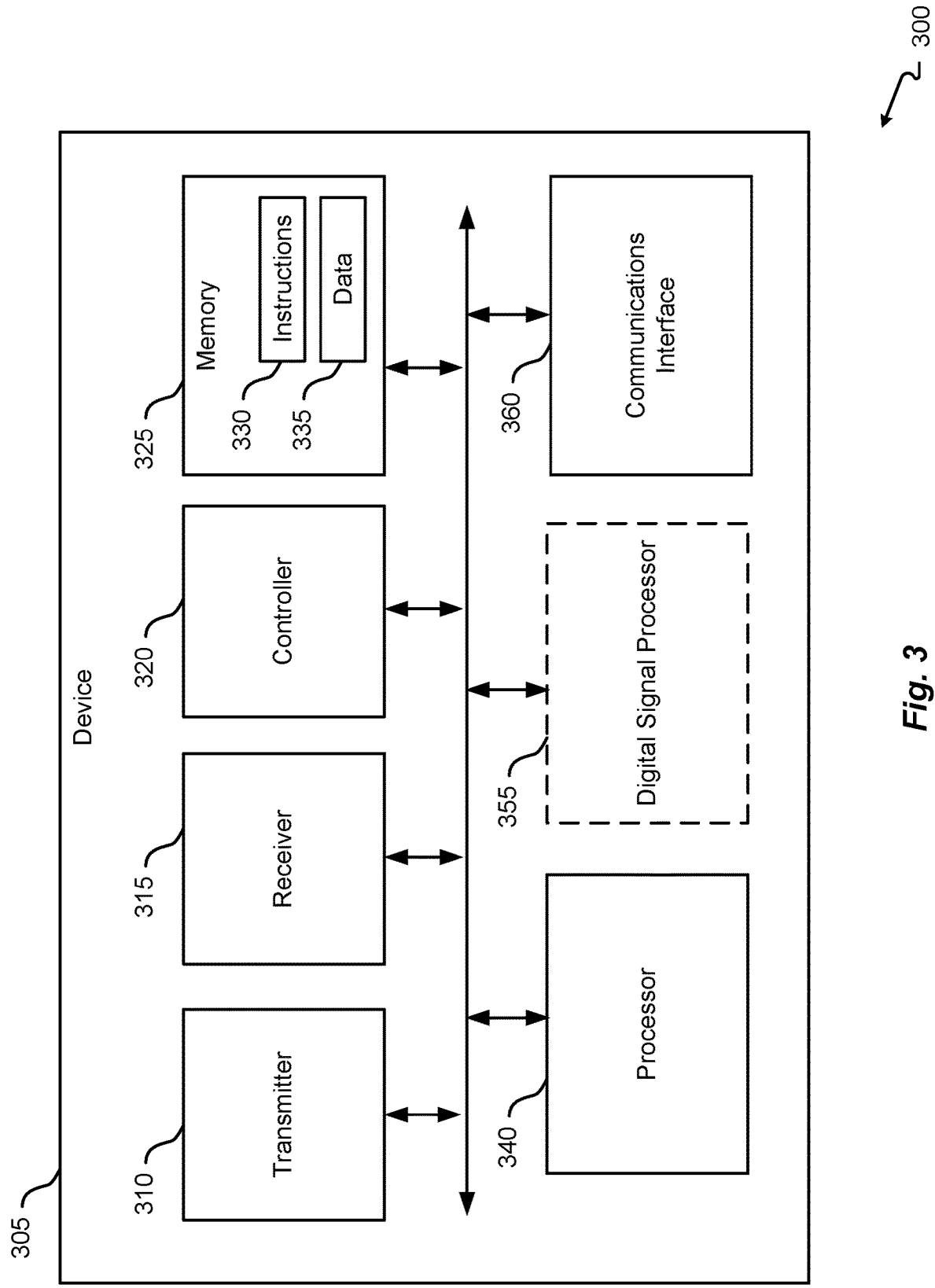
FIG. 3 illustrates an example of a system that supports redundancy DBI sharing in accordance with aspects of the present disclosure.

FIG. 3 illustrates an example of a system that supports redundancy DBI sharing in accordance with aspects of the present disclosure. The system 300 may include a device 305. The device 305 may include aspects of the device 105 or the encoder 200 described with reference to FIGS. 1 and 2. In some cases, the device 305 may be referred to as a computing resource. The device 305 may perform any or all of the operations described in the present disclosure.

The device 305 may include a transmitter 310, a receiver 315, a communications interface 320, a controller 320, a memory 325, a processor 340, and a communications interface 360. In some examples, components of the device 305 (e.g., transmitter 310, receiver 315, controller 320, memory 325, processor 340, communications interface 360, etc.) may communicate over a system bus (e.g., control busses, address busses, data busses, etc.) included in the device 305. The transmitter 310, receiver 315, and controller 320 may include aspects of the transmitter 110, receiver 145, and controller 155 described with reference to FIG. 1. The data busses of the system bus may include example aspects of the data bus 125 described herein.

The transmitter 310 and the receiver 315 may support the transmission and reception of signals to and from the device 305. In some aspects, the transmitter 310 and the receiver 315 may support the transmission and reception of signals within the device 305. The transmitter 310 and receiver 315 may be collectively referred to as a transceiver. An antenna may be electrically coupled to the transceiver. The device 305 may also include (not shown) multiple transmitters 310, multiple receivers 315, multiple transceivers and/or multiple antennas.

The controller 320 may be located on a same chip (e.g., ASIC chip) as the transmitter 310 and/or the receiver 315. In some cases, the controller 320 may be located on a different chip as the transmitter 310 and/or the receiver 315. In some examples, the controller 320 may be located on a chip of or on a chip of another device 305. The controller 320 may instruct the transmitter 310 to use one or more DBI encoding algorithms for encoding data to be sent via a data bus. In some examples, the controller 320 may instruct the receiver 315 to use one or more DBI encoding algorithms for decoding data that is received via the data bus. In some examples, the controller 320 may be a programmed microprocessor or microcontroller. In some aspects, the controller 320 may include one or more CPUs, memory, and programmable I/O peripherals.

The memory 325 may be any electronic component capable of storing electronic information. The memory 325 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 325 may include instructions 330 (computer readable code) and data 335 stored thereon. The instructions 330 may be executable by the processor 340 to implement the methods disclosed herein. In some aspects, execution of the instructions 330 may involve one or more portions of the data 350. In some examples, when the processor 340 executes the instructions 330, various portions of the instructions 330 and/or the data 335 may be loaded onto the processor 340.

The processor 340 may correspond to one or multiple computer processing devices. For example, the processor 340 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 325 of the device 305). For example, upon executing the instruction sets stored in memory 325, the processor 340 may enable or perform one or more functions of the device 305. In some examples, a combination of processors 340 (e.g., an advanced reduced instruction set computer (RISC) machine (ARM) and a digital signal processor (DSP) 355) may be implemented in the device 305.

The communications interface 360 may support interactions (e.g., via a physical or virtual interface) between a user and the device 305.

Figure 4:
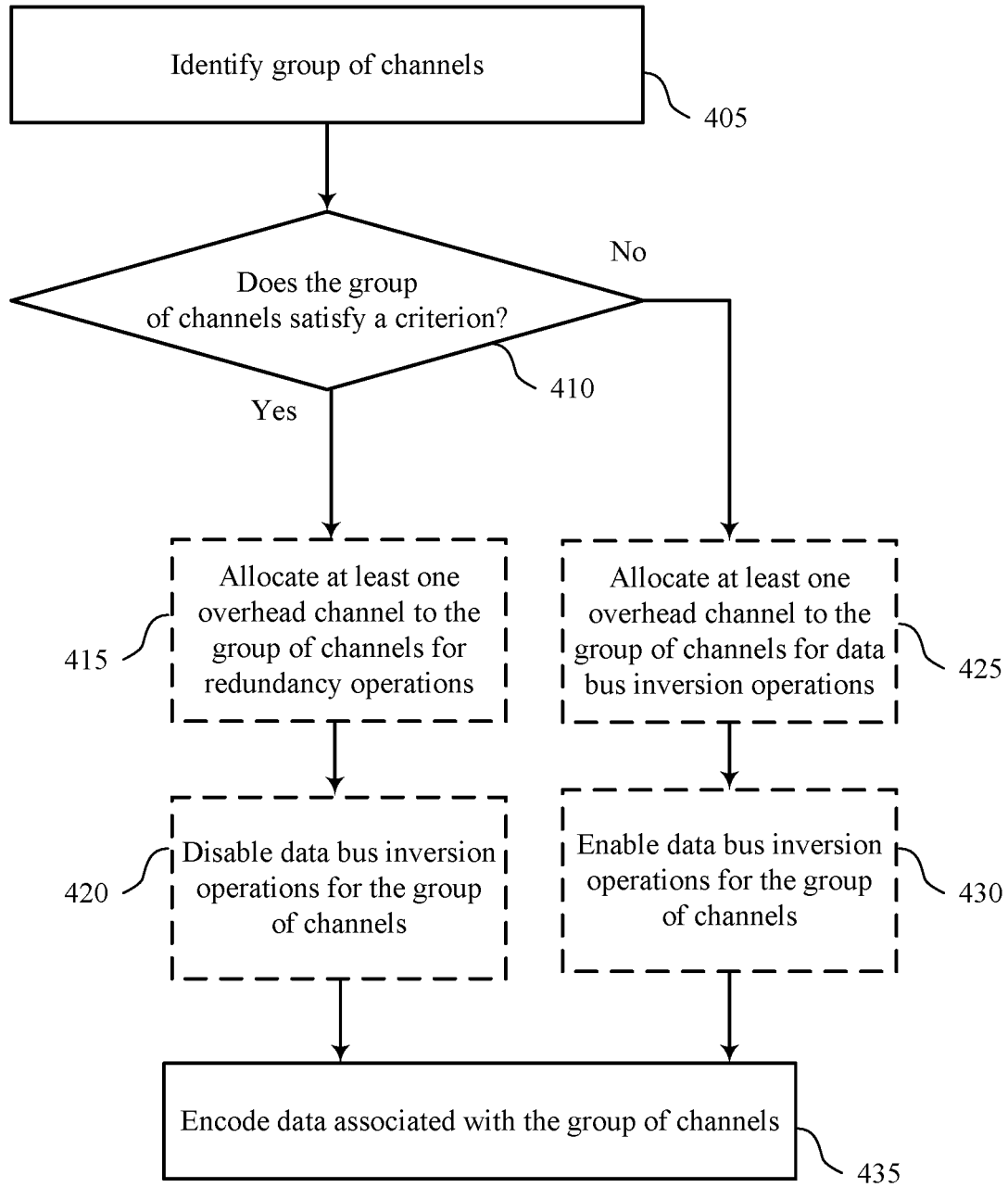
FIG. 4 illustrates an example of a process flow that supports redundancy DBI sharing in accordance with aspects of the present disclosure.

FIG. 4 illustrates an example of a process flow 400 that supports redundancy DBI sharing in accordance with aspects of the present disclosure. In some examples, process flow 400 may implement aspects of a device 105, an encoder 200, and/or a device 305 described with reference to FIGS. 1 through 3.

In the following description of the process flow 400, the operations may be performed in a different order than the order shown, or the operations may be performed in different orders or at different times. Certain operations may also be left out of the process flow 400, or other operations may be added to the process flow 400. It is to be understood that while a device 105 is described as performing a number of the operations of process flow 400, any device (e.g., another device 105 in communication with the device 105) may perform the operations shown.

At 405, the device 105 may identify a group of channels included in a data bus.

At 410, the device 105 may determine whether the group of channels satisfies a criterion. In some examples, the criterion may include a defect threshold associated with at least one channel of the group of channels.

At 415, the device 105 may allocate at least one overhead channel to the group of channels for a set of redundancy operations based on the determining of whether the group of channels satisfies the criterion. In some aspects, allocating the at least one overhead channel for the set of redundancy operations may be associated with a first priority. In some examples, the device 105 may allocate the at least one overhead channel for the set of redundancy operations based on determining the group of channels satisfies the criterion. In some examples, the at least one overhead channel may include redundant logic circuitry corresponding to at least one channel of the group of channels. In some examples, the at least one overhead channel may be allocated from a second group of channels included in the data bus.

In some examples, at 420, the device 105 may disable the set of data bus inversion operations for the group of channels based on determining the group of channels satisfies the criterion.

Alternatively, or additionally, at 425, the device 105 may allocate the at least one overhead channel to the group of channels for a set of data bus inversion operations based on the determining of whether the group of channels satisfies the criterion. In some aspects, allocating the at least one overhead channel for the set of data bus inversion operations may be associated with a second priority. In an example, the first priority for allocating the at least one overhead channel for the set of redundancy operations may be higher than the second priority for allocating the at least one overhead channel for the set of data bus inversion operations. That is, the device 105 may prioritize allocating the at least one overhead channel for the set of redundancy operations, over allocating the at least one overhead channel for the set of DBI operations. In some examples, the device 105 may allocate the at least one overhead channel for the set of data bus inversion operations based on determining the group of channels fails to satisfy the criterion.

In some examples, at 430, the device 105 may enable the set of data bus inversion operations for the group of channels based on determining the group of channels fails to satisfy the criterion.

At 435, the device 105 may encode data associated with the group of channels based on the allocating. In some examples, the encoded data may include a data bus inversion indicator. In some aspects, the device 105 may set a value for the data bus inversion indicator. In an example, the device 105 may set the value based on inverting the logic value associated with each channel of the group of channels or refraining from inverting the logic value associated with each channel of the group of channels.

In some other examples, the device 105 may identify a fault associated with at least one channel of the group of channels. In some examples, the fault may include a stuck-at fault having a logic value of zero or a logic value of one. In some cases, the device 105 may refrain from bypassing the at least one channel associated with the fault. In an example, the device 105 may invert a logic value associated with each channel of the group of channels based on a logic value associated with the fault and a logic value associated with the at least one channel. For example, the encoded data may include the inverted logic value associated with each channel of the group of channels. In another example, the device 105 may refrain from inverting the logic value associated with each channel of the group of channels based on the logic value associated with the fault and the logic value associated with the at least one channel. For example, the encoded data may include a non-inverted logic value associated with each channel of the group of channels.

In some examples, the device 105 may perform the operations described with reference to 405 through 435 for multiple groups of channels included in the data bus (e.g., iteratively, in parallel, etc.). For example, the device 105 may further identify one or more other groups of channels included in the data bus. The device 105 may determine whether each of the one or more other groups of channels satisfies a criterion (e.g., a defect threshold associated with at least one channel of the respective group of channels). The device 105 may allocate a respective overhead channel to each of the one or more other groups of channels for a set of redundancy operations or a set of data bus inversion operations. The allocation may be based on the determining of whether each group of channels satisfies a criterion. In some examples, the overhead channels respectively allocated for the groups of channels may be included in the data bus. In an example, the device 105 may encode data associated with the one or more other groups of channels based on the allocation of the at least one respective overhead channel.

Particular aspects of the subject matter described herein may be implemented to realize increased power savings, reduced SSO, improved reliability, and/or improved yield. Aspects of the subject matter may be implemented to utilize DBI techniques and logic redundancy techniques while optimizing (e.g., minimizing) channel overhead, signaling overhead, and/or processing overhead.

Any of the steps, functions, and operations discussed herein can be performed continuously and automatically.

The exemplary apparatuses, systems, and methods of this disclosure have been described in relation to examples of a device 105, an encoder 200, and device 305. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed embodiments, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

What is claimed is:

1. An apparatus comprising:
a data bus;
a processor; and
memory in electronic communication with the processor; and
instructions stored in the memory, the instructions being executable by the processor to:
identify a group of channels included in the data bus;
determine whether the group of channels satisfies a criterion;
allocate at least one overhead channel to the group of channels for a set of redundancy operations or a set of data bus inversion operations based at least in part on the determining, wherein the at least one overhead channel is included in the data bus; and
encode data associated with the group of channels based at least in part on the allocating.

2. The apparatus of claim 1, wherein:
allocating the at least one overhead channel for the set of redundancy operations is based at least in part on determining the group of channels satisfies the criterion.

3. The apparatus of claim 2, wherein the instructions are further executable by the processor to:
disable the set of data bus inversion operations for the group of channels based at least in part on determining the group of channels satisfies the criterion.

4. The apparatus of claim 1, wherein:
allocating the at least one overhead channel for the set of data bus inversion operations is based at least in part on determining the group of channels fails to satisfy the criterion.

5. The apparatus of claim 4, wherein the instructions are further executable by the processor to:
enabling the set of data bus inversion operations for the group of channels based at least in part on determining the group of channels fails to satisfy the criterion.

6. The apparatus of claim 1, wherein the instructions are further executable by the processor to:
identify one or more other groups of channels included in the data bus;
determine whether each of the one or more other groups of channels satisfies a criterion; and
allocate a respective overhead channel to each of the one or more other groups of channels for a set of redundancy operations or a set of data bus inversion operations, wherein the allocating is based at least in part on the determining, and wherein the respective overhead channel is included in the data bus; and
encoding data associated with the one or more other groups of channels based at least in part on the allocating.

7. The apparatus of claim 1, wherein:
allocating the at least one overhead channel for the set of redundancy operations is associated with a first priority; and
allocating the at least one overhead channel for the set of data bus inversion operations is associated with a second priority.

8. The apparatus of claim 7, wherein the first priority is higher than the second priority.

9. The apparatus of claim 1, wherein:
the at least one overhead channel comprises redundant logic circuitry corresponding to at least one channel of the group of channels.

10. The apparatus of claim 1, wherein the criterion comprises a defect threshold associated with at least one channel of the group of channels.

11. The apparatus of claim 1, wherein the instructions are further executable by the processor to:
identify a fault associated with at least one channel of the group of channels; and
invert a logic value associated with each channel of the group of channels or refrain from inverting the logic value associated with each channel of the group of channels, based at least in part on a logic value associated with the fault and a logic value associated with the at least one channel,
wherein the encoded data comprises the inverted logic value associated with each channel of the group of channels or a non-inverted logic value associated with each channel of the group of channels.

12. The apparatus of claim 11, wherein the instructions are further executable by the processor to:
refrain from bypassing the at least one channel associated with the fault.

13. The apparatus of claim 11, wherein:
the fault comprises a stuck-at fault; and
the fault comprises a logic value of zero or a logic value of one.

14. The apparatus of claim 11,
wherein the encoded data comprises a data bus inversion indicator.

15. The apparatus of claim 14, wherein the instructions are further executable by the processor to:
set a value for the data bus inversion indicator, wherein setting the value is based at least in part on inverting the logic value associated with each channel of the group of channels or refraining from inverting the logic value associated with each channel of the group of channels.

16. The apparatus of claim 1, wherein the at least one overhead channel is allocated from a second group of channels included in the data bus.

17. A system comprising:
a data bus;
a controller, wherein the controller is configured to:
identify a group of channels included in the data bus;
determine whether the group of channels satisfies a criterion; and
allocate at least one overhead channel to the group of channels for a set of redundancy operations or a set of data bus inversion operations based at least in part on the determining, wherein the at least one overhead channel is included in the data bus; and
a transceiver, wherein the transceiver is configured to:
encode data associated with the group of channels based at least in part on the allocating.

18. The system of claim 17, wherein:
allocating the at least one overhead channel for the set of redundancy operations is based at least in part on determining the group of channels satisfies the criterion.

19. The system of claim 17, wherein:
allocating the at least one overhead channel for the set of data bus inversion operations is based at least in part on determining the group of channels fails to satisfy the criterion.

20. A device comprising:
a data bus comprising:
a group of channels; and
at least one overhead channel;
first logic circuitry configured to determine whether the group of channels satisfies a criterion;
second logic circuitry configured to allocate the at least one overhead channel to the group of channels for a set of redundancy operations or a set of data bus inversion operations based at least in part on the determining; and
a transceiver configured to encode data associated with the group of channels based at least in part on the allocating.

21. The device of claim 20, wherein:
the device is an application specific integrated circuit (ASIC).

22. A method comprising:
identifying a group of channels included in a data bus;
determining whether the group of channels satisfies a criterion;
allocating at least one overhead channel to the group of channels for a set of redundancy operations or a set of data bus inversion operations based at least in part on the determining, wherein the at least one overhead channel is included in the data bus; and
encoding data associated with the group of channels based at least in part on the allocating.

* * * * *